United States Patent [19]

Wahl

[11] 4,255,170
[45] Mar. 10, 1981

[54] VENTING DEVICE FOR THE HOUSING OF A ROTARY MACHINE

[75] Inventor: Georg Wahl, Crailsheim, Fed. Rep. of Germany

[73] Assignee: Voith Turbo GmbH & Co. KG, Crailsheim, Fed. Rep. of Germany

[21] Appl. No.: 46,662

[22] Filed: Jun. 8, 1979

[30] Foreign Application Priority Data

Sep. 2, 1978 [DE] Fed. Rep. of Germany ....... 2838395

[51] Int. Cl.³ .............................................. B01D 35/04
[52] U.S. Cl. ....................................... 55/185; 55/203; 210/188
[58] Field of Search ................. 55/159, 178, 182, 185, 55/203; 210/168, 171, 188, 391

[56] References Cited

U.S. PATENT DOCUMENTS

| | | | |
|---|---|---|---|
| 3,769,207 | 10/1973 | Baer | 55/178 |
| 3,839,203 | 10/1974 | Jackson | 210/391 X |
| 4,039,305 | 8/1977 | Livesay | 55/159 |
| 4,170,457 | 10/1979 | Tetro | 55/178 |

Primary Examiner—John Adee
Attorney, Agent, or Firm—Ostrolenk, Faber, Gerb & Soffen

[57] ABSTRACT

The disclosure concerns a venting device for the housing of a rotary machine. The housing has a venting duct leading from the interior of the housing outwardly through a liquid-mist or oil-mist separator. A peeling device is arranged closely adjacent to the peripheral surface of a rotating member of the rotary machine. The peeling device intercepts the boundary layer of mist laden air that is rotating with the peripheral surface and directs the air boundary layer into the venting duct which in turn extends to a liquid or oil-mist separator or filter. The peeling device thus transforms the kinetic energy of the oil laden atmosphere at the peripheral surface of the rotating member into pressure which will drive the oil-mist laden atmosphere through a filter. The peeling device is directed so that it has an entrance opening facing in a direction counter to the direction of rotation of the rotating member so that it will peel off the boundary layer of liquid-mist or oil-mist laden air as the rotating member rotates.

12 Claims, 4 Drawing Figures

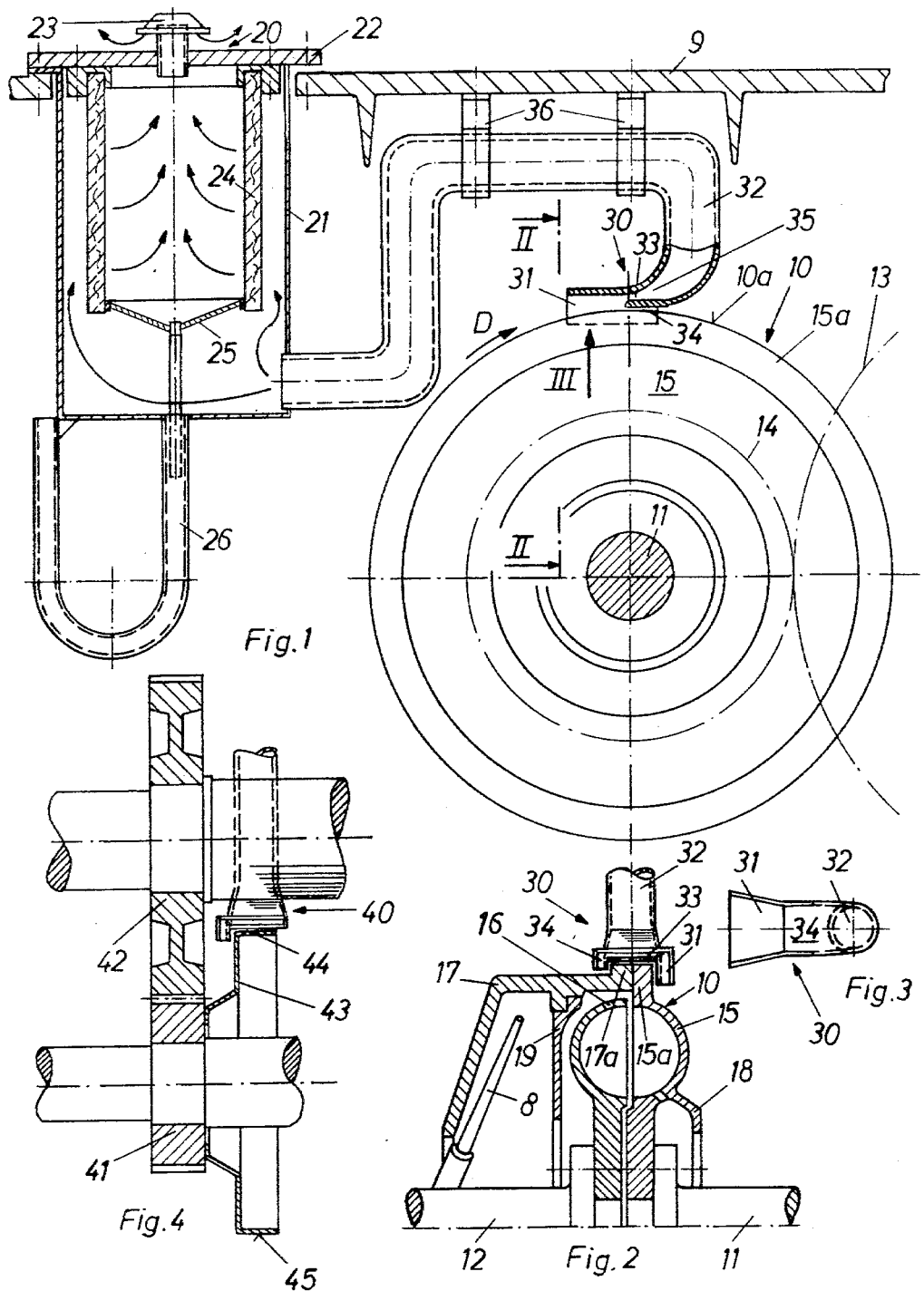

VENTING DEVICE FOR THE HOUSING OF A ROTARY MACHINE

BACKGROUND OF THE INVENTION

The present invention relates to a venting device for venting the housing of a rotary machine.

As the rotor of a rotary machine rotates inside a housing, the lubricating oil and/or working fluid or oil or other liquid in the housing and located at the rotor is broken up into small droplets, which create a mist in the housing. A typical venting device for venting the mist laden atmosphere of the housing has a vent duct leading from inside the housing out through a liquid-mist or oil-mist separator or filter and has means for directing at least a portion of the mist laden atmosphere or air from the inside of the housing through the vent duct to the mist separator.

Rotary machines in which such venting devices are used include, for example: gear arrangements in which the rotor is a gear; a clutch enclosed in a housing, and particularly a hydrodynamic clutch, in which the rotor is formed by one of the clutch halves; units in which a clutch, which is preferably of a hydrodynamic nature, is combined with gear drives.

In such rotary machines, oil may be used as a lubricant and as a power transmission fluid, or both. When such a machine operates at high rotary speeds, atomizing of the oil takes place. Furthermore, pressure is developed within the housing so that the housing atmosphere which is laden with an oil-mist penetrates outward through the shaft packings contained in the housing. Part of the oil is lost as it drips from the packing rings, and the air surrounding the device may be contaminated with oil.

For these reasons, it is known to provide a venting duct from the housing having an oil-mist separator in it, so that the pressure within the housing can be substantially reduced. In previously known rotary machines, the venting duct is passed through the housing wall and the oil-mist separator is placed on the housing. The oil-mist separator typically comprises a filter cartridge arranged in a filter pot. The resistance to flow exerted by the filter can assume a considerable value, depending upon the filter material used, particularly if a high degree of purity of the discharged air is desired. In such cases, it is frequently necessary to associate a blower with the oil-mist separator. This manner of construction is, however, expensive and energy is continuously required for driving the blower. Such an arrangement is shown in U.S. Pat. No. 3,633,341.

Another known venting device shown in West German Unexamined Application (Offenlegungsschrift) No. 26 43 767, at FIG. 3, satisfies only moderate requirements. In that case, the venting duct is passed outward through the rotor shaft. An oil-mist filter is also arranged within the rotor shaft. No conveying device for the air to be discharged is provided in this case.

SUMMARY OF THE INVENTION

The primary object of the invention is to effectively vent mist laden atmosphere from the housing of a rotary machine.

A further object of the invention is to vent the atmosphere without having to supplement the pressure supplied by the rotary parts of the machine.

Yet another object of the invention is to effectively utilize the pressure supplied by the rotary parts of the machine to cause the venting.

A still further object of the invention is to effectively remove the oil or other liquid-mist from the mist laden air.

Another object of the present invention is to arrange the venting device to peel the boundary layer of the atmosphere or air in the housing which is adjacent a rotating surface of a rotor moving at high speed in such a manner that, despite the use of a filter having high resistance to flow, energy-saving transport of the mist laden atmosphere or air to be discharged is assured.

According to the invention a peeling device is provided adjacent to a relatively high speed rotating surface of a rotor within the machine housing. This directs the boundary layer of air that is adjacent the rotating surface into the venting duct. The kinetic energy of the air in the venting duct thus generates a high enough pressure in the venting duct to permit liquid-mist or oil-mist separating devices, typically filters, to be used which are finer and more thorough than filters which have previously been used. This will serve to purify the air flowing into the atmosphere outside the machine housing.

The objects of the invention are realized by selecting a rotating part having the desired rotary speed as the part from which the boundary layer is removed. If necessary, a flange may be secured to the rotary part, wherein the flange has a larger diameter and, hence, a higher peripheral speed than the rotary part. A surface of that flange may be arranged substantially perpendicular to a diameter of the flange. The peeling device is placed adjacent that flange surface.

The kinetic energy of the liquid-mist or oil-mist laden boundary layer of air present at the peripheral surface of a rotary element is utilized to produce the pressure required on the inflow side of the mist separator or filter. To our surprise, it has been found that by placing a simple peeling device on the surface of the rotor element, the boundary layer of air can be transferred into the venting duct so as to form a dynamic pressure which is more than sufficient for the charging of the mist separator or filter.

The end result obtained with the invention could be achieved by providing a blower which is driven by the rotor. However, it has been found that the inventive peeling device requires much less structure and expense for the same operational efficiency.

The advantage of the invention, however, does not reside merely in the simplicity of its construction but also in the fact that the energy consumption for the transport of the air is negligible. Furthermore, the invention makes it possible to utilize a substantially more effective filter material for the removal of the oil-mist or liquid-mist, for instance a fiberglass mat, instead of the customary paper filters.

One preferred field of use for the invention consists of a hydrodynamic clutch which is arranged within a stationary clutch or gear housing (see for instance U.S. Pat. No. 3,633,341 or West German Patent Application No. P 27 48 386.9-12, corresponding to United States Ser. No. 953,037, filed Oct. 20, 1978). The rotating clutch parts and any gears arranged along the clutch cause a particularly strong atomizing or misting of working fluid or oil and lubricating oil in the housing. The formation of oil mist can, for instance, be particularly intensive at the place where the feeding of the working oil into the work chamber of the clutch is effective via an open collecting trough arranged on the primary impeller.

However, the invention can also be used for pure gear-works or in high-speed piston machines, in the latter case for the venting of the crank housing.

In the case of hydrodynamic clutches, it has proven particularly advisable to arrange the peeling device on the outer periphery of the primary-side rotor, preferably on a circular cylindrical outer surface thereof. On the one hand, the circumferential speed is particularly high there, even if the secondary part of the clutch rotates at a lower speed of rotation than the primary part. On the other hand, it has been found that at this place, the amount of oil-mist in the air is less than at most other points within the housing. Both of these circumstances increase the effectiveness of the venting device of the invention.

Other objects and features of the invention will be understood from the following description of the invention taken in conjunction with the accompanying drawings.

BRIEF DESCRIPTION OF THE DRAWINGS

FIG. 1 shows a venting device according to the invention arranged on a hydrodynamic clutch;

FIG. 2 is a section along the line II—II of FIG. 1;

FIG. 3 is a view seen in the direction of the arrow III in FIG. 1;

FIG. 4 shows a venting device according to the invention arranged in a gear drive.

DESCRIPTION OF THE PREFERRED EMBODIMENTS

Referring to FIGS. 1 and 2, the hydrodynamic clutch 10 transmits the torque from a primary shaft 11 to a secondary shaft 12. The primary shaft 11 is driven via a step-up gear pair 13, 14 which are indicated by dot-dash lines in FIG. 1. The clutch 10 and the gears 13, 14 are contained within a gear housing 9.

As is shown in the art, the clutch 10 has a primary impeller or bladed or bucket wheel 15 secured to the primary shaft 11, which shaft is driven by drive means (not shown) to rotate. The clutch includes a secondary impeller or bladed or bucket wheel 16 secured to the secondary shaft 12. The secondary impeller 16 and shaft 12 are driven by rotation of the primary impeller 15. A flange 15a is developed on the primary impeller 15. A coupling shell 17 is fastened to the flange 15a by another flange 17a. Coupling shell 17 has a partition 19, which surrounds the secondary impeller 16. The feeding of oil as an operating fluid into the toroidal work chamber of the clutch 10 is through a pipe (not shown) which discharges into an annular collecting trough 18. An outlet nozzle 8, which is preferably movable, extends inside of the shell 17. The outlet nozzle 8 provides for the discharge of operating fluid.

In clutches of this type, the speed of rotation of the primary shaft 11 can attain approximately 6,000 rpm. With a diameter of the flanges 15a, 17a of approximately 0.6 meter, the maximum peripheral speed of the flanges can attain 200 meters per second. As a result of this high peripheral speed, the gears which are coated with oil and the clutch 10 cause intensive atomizing of the oil within the gear housing 9. Elevated pressure is therefore produced inside the housing 9.

The pressure in the housing must be reduced by a venting device having an oil-mist separator 20. The oil-mist separator includes a filter port 21 made of sheet metal which is inserted into an opening in the gear housing 9. A lid 22 with a vent connection 23 covers the opening into the housing. A filter cartridge 24 is secured to the lid 22 and has a funnel 25 secured beneath the cartridge. The funnel 25, removes the separated oil by discharging into a U-curved pipe 26 that is connected to the bottom of the filter pot 21.

In accordance with the invention, a peeling device 30 is arranged on the outer circumference of the flanges 15a, 17a in order to direct that portion of the air or atmosphere inside the gear housing 9 adjacent the periphery of flanges 15ia, 17a into the oil-mist separator 20. As can be noted from FIGS. 1 to 3, the peeling device comprises a funnel-shaped collecting plate 31 which is open on one side to receive the flanges 15a, 17a (see FIG. 2) of the clutch 10 and narrows in the direction of rotation (arrow D).

The collecting plate 31 communicates into a pipe 32 which has a slot-like inlet opening 33 of narrow height, rectangular cross-section. The inlet opening 33 preferably extends across the entire width of the flanges 15a, 17a. The inlet opening 33 is defined on its longitudinal side closest to flanges 15a, 17a by a peeling plate 34, which is arranged at a very small distance (about 1 mm) from the outer peripheral surface 10a of the flanges 15a, 17a. Although the surface 10a is preferably cylindrical, it may also be conical. The leading or inlet edge of the peeling plate 34 can be pointed, if necessary. The inlet opening 33 and the funnel entrance thereinto open counter to the rotation direction D of the rotating surface 10a and preferably tangential to that surface.

Adjoining the inlet opening 33, the pipe 32 is shaped to form a nozzle-like cross-section, widened section 35, which is as uniform as possible. This is followed by a transition to the circular cross-section of pipe 32. The pipe 32 discharges into the filter pot 21. The pipe 32 is fastened by supports 36 to the housing 9.

With the peeling device 30 positioned in the manner described, it is possible to collect the air boundary layer which is present at the outer peripheral surface 10a and which rotates with high velocity and to convert its kinetic energy substantially into pressure energy. As a result, a filter material which is particularly suitable for the separation of the oil-mist but which requires a high pressure difference can be used for the filter cartridge 24, e.g. woven fiber glass.

In the embodiment shown in FIG. 4 the peeling device 40 is positioned and operates in the same manner, in principle, as the device shown in FIGS. 1 to 3. However, FIG. 4 shows a pure gear drive comprised of a small gear 41 and a large gear 42. A plate-shaped disc 43 comprised of sheet metal is attached to the small gear 41, which rotates with the higher speed of rotation. Collar 44 on disc 43 has a preferably cylindrical outer surface 45. The diameter of this surface 45 is considerably larger than the diameter of gear 41 and the circumferential speed thereof is thus correspondingly higher. The high speed of surface 45 substantially contributes to the effectiveness of the peeling device 40. However, under certain circumstances, the circumferential velocity at the outer circumference of the gears 41, 42 may also be sufficient. In such a case, the peeling device can be arranged directly on one of the gears 41 or 42, with the consequent elimination of the disc 43.

In the foregoing, the present invention has been described in connection with illustrative embodiments thereof. Since many variations and modifications will now be obvious to those skilled in the art, it is preferred that the scope of this invention be determined, not by the specific disclosures herein contained, but only by the appended claims.

What is claimed is:

1. A venting device for venting the housing of a rotary machine, wherein:

said machine includes a housing; a rotating part in said housing; said rotating part including a rotating surface thereof which is on the outside of said rotating part in said housing;

said venting device comprising:

venting duct means leading from inside said housing to outside thereof;

a liquid-mist separator located in said duct means for removing liquid-mist from air passing through said separator;

a peeling device placed and shaped for removing the boundary layer of mist-laden air which is rotating along with said rotating surface; said peeling device serving as an inlet to said venting duct means, whereby the kinetic energy of the boundary layer of mist laden air peeled off by said peeling device drives the mist laden air through said duct means and through said liquid-mist separator.

2. The venting device of claim 1, wherein said rotating surface is the outermost surface of said rotating part.

3. The venting device of claim 2, wherein said outermost surface is circularly cylindrical in shape.

4. The venting device of claim 2, wherein said rotating part comprises a rotor; an additional structural part attached to said rotor and rotatable therewith; said rotating surface being on said additional structural part.

5. The venting device of claim 4, wherein said additional structural part has a diameter such that said rotating surface thereof has a greater diameter than said rotor.

6. The venting device of claim 2, wherein said peeling device has a narrow inlet opening positioned adjacent to said rotating surface and opening counter to the direction of rotation of said rotating surface for receiving the boundary layer of air being carried along by said rotating surface.

7. The venting device of claim 6, wherein said peeling device further comprises a nozzle shaped section downstream in said peeling device of said inlet opening and said nozzle shaped section gradually widening in cross-section in the direction of flow away from said inlet.

8. The venting device of claim 7, wherein said inlet opening comprises an opening of generally slot shape, which is quite short in height above said rotating surface.

9. The venting device of either of claims 6 or 8, further comprising a funnel-shaped collection plate which leads to and narrows to said inlet opening into said peeling device.

10. The venting device of claim 2 wherein said rotary machine includes a rotor therein which is said rotary part thereof.

11. The venting device of claim 10, wherein said rotary machine comprises a hydrodynamic clutch comprising a rotatable primary side impeller to which a driving force is applied and a rotatable secondary side impeller which is caused to rotate by said primary side impeller; said primary side impeller comprising said rotating part.

12. The venting device of claim 10, wherein said rotating part comprises one of a plurality of meshing rotatable gears.

* * * * *